United States Patent Office 3,228,653
Patented Jan. 11, 1966

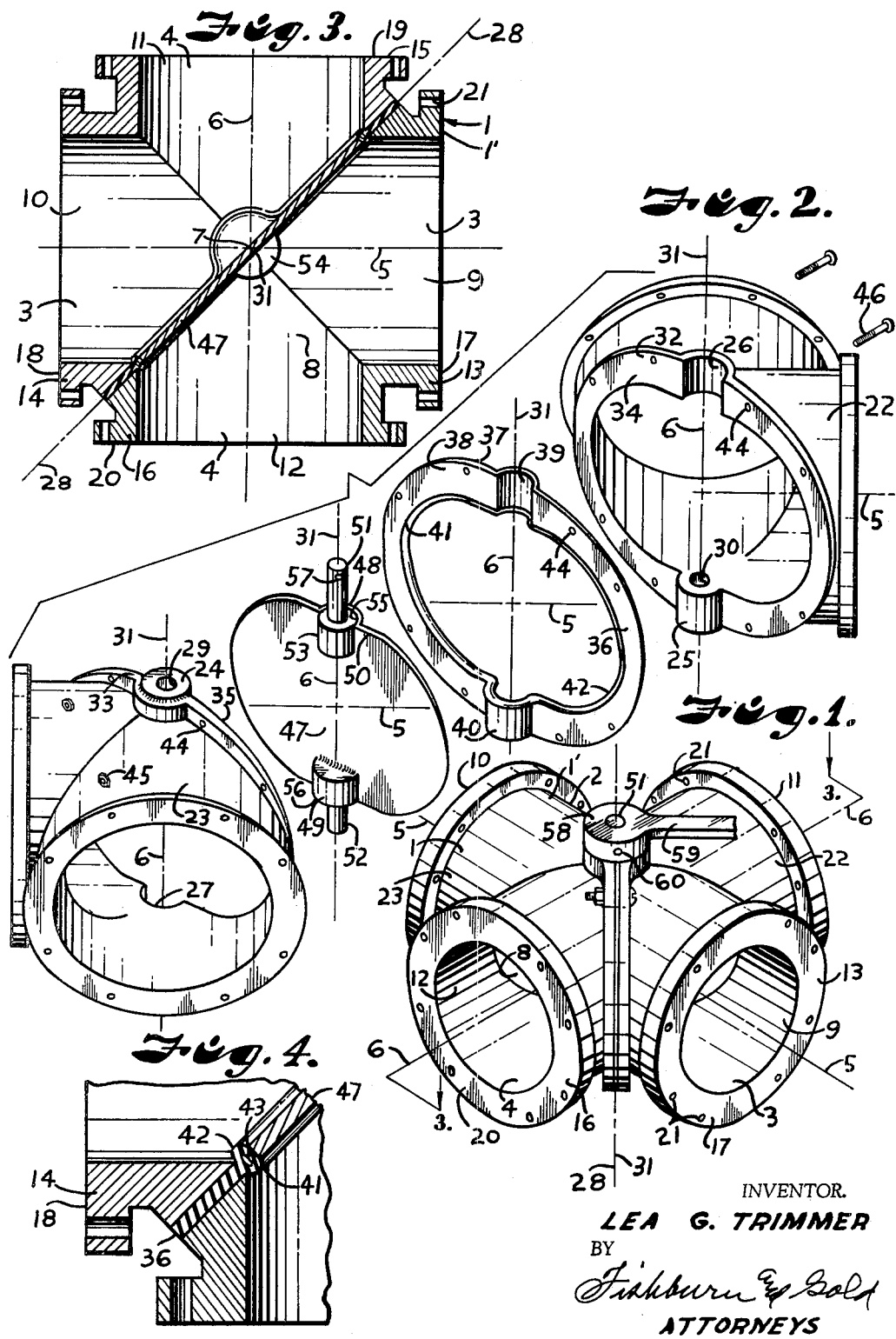

3,228,653
BUTTERFLY VALVE DEVICE HAVING PARTICULAR SEAL AND SPLIT-BODY STRUCTURE
Lea G. Trimmer, 2418 Walnut St., Kansas City, Mo.
Filed Aug. 15, 1962, Ser. No. 217,225
3 Claims. (Cl. 251—306)

This invention relates to valves and more specifically to valves having a vane or butterfly control.

The principal objects of the present invention are: to provide a valve having a body comprised of two identical half portions for ease of fabrication; to provide such a valve having unique sealing means for the control of gas or fluid flow therethrough; to provide a butterfly valve wherein the vane seals by 360° radial peripheral abutment with a sealing bead; to provide a valve body having walls forming intersecting passageways producing a plurality of ports; to provide such a valve wherein the vane may be rotated unidirectionally on its axis without having to reverse rotation to obtain an open or closed position thereof; to provide such a butterfly valve which uses the O-ring principle for sealing in closed position; and to provide such a valve control construction which is simple in design and inexpensive to produce while offering positive sealing control for liquid or gaseous fluids.

Other objects and advantages of this invention will become apparent from the following description taken in connection with the accompanying drawings wherein are set forth by way of illustration and example certain embodiments of this invention.

FIG. 1 is a perspective view of an assembled butterfly valve embodying this invention.

FIG. 2 is an exploded perspective view showing the various pieces of the valve in disassembled relation.

FIG. 3 is a cross sectional view through the valve taken on the line 3—3 of FIG. 1 particularly showing the valve vane in closed position.

FIG. 4 is a fragmentary cross sectional view through the valve on an enlarged scale particularly showing the vane periphery in sealing contact with a gasket bead.

Referring to the drawings in more detail:

The reference numeral 1 generally indicates a butterfly valve embodying this invention. The valve 1 includes a body 1' having walls 2, in the illustrated example, forming two intersecting cylindrical passageways of equal diameter respectively designated 3 and 4. The passageways 3 and 4 are located in relation to each other whereby the center lines 5 and 6 respectively thereof intersect at right angles at the center 7 of the valve.

The intersecting portions of the cylindrical passageways 3 and 4 define a flow control chamber 8 within the valve body. The cylindrical passageways 3 and 4 respectively terminate at opposite ends thereof in circular ports 9, 10, 11 and 12. The ports 9, 10, 11 and 12, in the illustrated example, are surrounded respectively by flanges 13, 14, 15 and 16 having faces 17, 18, 19 and 20 located in planes extending at 90° angles to the planes of adjacent port flange faces. Suitable circumferentially spaced bores 21 extend through the flanges 13, 14, 15 and 16 for connecting the respective ports to fluid carrying hoses or the like (not shown).

The valve body 1' is formed of two half portions designated 22 and 23. The half portions 22 and 23, in the illustrated example, each support a protruding bearing boss 24 and 25 respectively and a bearing boss nesting recess 26 and 27 respectively. As noted further hereinafter the half portions 22 and 23 are identical and thus may be formed in the same mold, however, they appear to be different (FIG. 2) because in assembly they are rotated 180° from each other so that the respective bearing bosses 24 and 25 may be received into the respective bearing boss nesting recesses 26 and 27.

The half portions 22 and 23 are separable, except for said bearing bosses 24 and 25 and bearing boss nesting recesses 26 and 27, on a parting plane 28 extending at 45° to the passageway center lines 5 and 6. The parting plane 28 also extends 90° to the plane containing the passageway center lines 5 and 6.

The bearing bosses 24 and 25 are positioned on opposite sides of the plane containing the center lines 5 and 6 and aligned shaft receiving bores 29 and 30 respectively extend therethrough. The bores 29 and 30 are located on a center line 31 extending perpendicularly through the plane containing the center lines 5 and 6 at the body center 7.

Elliptical body flanges 32 and 33 are formed on each of the half portions 22 and 23 and respectively have faces 34 and 35 parallel to the parting plane 28. A resilient elliptical ring gasket 36, of any suitable resilient sealing material such as neoprene, has oppositely facing plane sealing surfaces 37 and 38 respectively contacting the body flange faces 34 and 35. The gasket 36 includes a pair of oppositely extending bulges or protuberances 39 and 40 located 180° apart and respectively received in the nesting recesses 26 and 27 with the bearing bosses 24 and 25.

The gasket 36 has inner diametrical dimensions slightly smaller than the respective diametrical dimensions of the chamber 8 at the parting plane 28 whereby the inner edge 41 of the gasket 36 extends into the chamber. A continuous resilient generally cylindrical peripheral bead 42 is integrally formed as a part of the ring gasket 36 at the inner edge 41 and lies adjacent the walls forming the chamber 8 along the parting line 28. If desired the bead 42 may be hollow as at 43 to increase the resiliency thereof to obtain greater ease of sealing as described hereinafter. Suitably aligned circumferentially spaced bores 44 extend through the body flanges 32 and 33 and the gasket 36 for cooperating with joining members such as nuts 45 and bolts 46 to produce valve assembly.

An elliptical vane 47 is located in the chamber 8 and diametrically substantially fills the chamber at the parting plane 28. The vane 47, in the illustrated example, has oppositely extending protuberances 48 and 49 which alter the peripheral edge 50 thereof whereby said edge may be located in continuously (360°) contacting and slidably sealing relation against the inner edge 41 (bead 42) of the gasket 36 for blocking flow therepast. This type of seal is sometimes referred to as an O-ring seal.

A pair of aligned stub shafts 51 and 52 respectively have mounting collars 53 and 54 adapted to be received in depressions 55 and 56 formed in the vane when making the protuberances 48 and 49. The mounting collars 53 and 54 are suitably secured in the depressions 55 and 56, for example, by soldering or riveting whereby the stub shafts 51 and 52 extend radially oppositely outwardly of the vane peripheral edge 50. When the valve is assembled the stub shafts 51 and 52 are respectively rotatably mounted in the shaft receiving bores 29 and 30 and the axis of the stub shafts 51 and 52 aligns with the bore center line 31. It is to be understood that in assembling the valve illustrated herein, a sliding action must take place along the parting plane 28 so that the stub shafts 51 and 52 may simultaneously engage in their respective receiving bores.

The stub shaft 52 extends externally of the body 1' and contains a suitable pin receiving bore 57. A collar 58 forming part of a suitable lever arm 59 surrounds the exposed portion of the stub shaft 51 and a suitable pin 60 extends through both the collar 58 and the pin receiving bore 57 to provide a connection for applying torque to the vane 47 to selectively open and close the valve.

It has been determined that very little torque or pressure is required to obtain an interference fit between the bead 42 and the peripheral edge 50 of the vane in order to obtain a leak-proof seal which is effective even for blocking surprisingly high pressures. As noted above, since the bead 42 abuts radially with the peripheral edge 50 instead of on one of the faces of the vane 47, the vane may be rotated in the same direction over 360° and still come to rest in a sealing position. Without this feature the vane would require a reversal in direction for opening and closing due to a dead stop abutment between the vane and the sealing member. Thus, the flexibility and ease of control of the valve is increased.

Because the body half portions 22 and 23 of the valve are identical great cost savings may be realized in valve production and inventory control since only a single mold and production sequence is required and accounting for separate parts is unnecessary. It is to be understood that although the illustrated example embodying this invention shows a protuberance (24 and 25) on each body half portion requiring that the portion be rotated 180° to each other for fitting together, recesses instead of protuberances may be designed into the respective half portions making them completely symmetrical on each side of a plane containing the cylindrical passageway center lines whereby the respective half portions need not be rotated for matching. In the latter case, however, it may be desirable to insert separate sleeves (not shown) in the opening created by the abutting recesses for receiving the vane stub shafts.

It is noted that if the sealing requirements are not critical, for example, in a flue or the like where pressures are low and slight leakage may be tolerated, the ring gasket 36 may be fabricated in two half sections of slightly less than 180° a piece thus eliminating the integral molding of the ring gasket with the protuberances 39 and 40. This, however, would not permit 360° sealing about the vane periphery. Also, although the illustrated example shows a valve having four ports symmetrically spaced 90° from each other the principles of this invention may be embodied in valves having a lesser or greater number of ports and in valves wherein the passageways are not on center lines 90° from each other, so long as the required symmetry is maintained on opposite sides of a parting line.

It is to be further understood that while one form of this invention has been illustrated and described it is not to be limited to the specific arrangement of parts herein described and shown except insofar as such limitations are included in the claims.

What I claim and desire to secure by Letters Patent is:
1. A butterfly valve comprising:
(a) a valve body having walls forming two intersecting passageways, said passageways being located in relation to each other whereby the center lines thereof intersect at the center of said body, the intersecting portions of said passageways defining a chamber within said body,
(b) said valve body being formed of two identical half portions, said half portions being separable on a parting plane containing said center,
(c) a body flange on each of said half portions and having a face parallel to said parting plane,
(d) a resilient ring gasket having oppositely facing sealing surfaces contacting said body flange faces,
(e) said gasket having an inner edge extending into said chamber and forming a continuous resilient peripheral bead located adjacent said walls,
(f) a rotatable vane in said chamber, said vane diametrically substantially filling said chamber on said parting plane, said vane presenting a peripheral edge continuously contacting and slidably sealing against said gasket bead for blocking flow therepast is closed position;
(g) means rotatably mounting said vane in said chamber and means operatively communicating with said vane to provide a connection for applying a torque for selectively opening and closing said vane.

2. A butterfly valve comprising:
(a) a valve body having walls forming two intersecting passageways, said passageways being located in relation to each other whereby the center lines thereof intersect at the center of said body, the intersecting portions of said passageways defining a chamber within said body,
(b) said valve body being formed of two identical half portions each supporting a bearing boss and a bearing boss nesting recess, said half portions being separable except for said bearing bosses and nesting recesses on a parting plane containing said center,
(c) said bearing bosses each forming a shaft receiving bore, said bores being located on a center line extending through said center,
(d) a body flange on each of said half portions and having a face parallel to said parting plane,
(e) a resilient ring gasket having oppositely facing sealing surfaces contacting said body flange faces, said gasket including a pair of oppositely extending protuberances located 180° apart and respectively received in said nesting recesses with said bearing bosses,
(f) said gasket having an inner edge extending into said chamber and forming a continuous resilient peripheral bead located adjacent said walls,
(g) a rotatable vane in said chamber, said vane diametrically substantially filling said chamber on said parting plane and having oppositely extending protuberances whereby said vane presents a peripheral edge continuously contacting and slidably sealing against said gasket bead for blocking flow therepast in closed position,
(h) said vane having a pair of oppositely extending stub shafts fixed thereto and respectively rotatably mounted in said receiving bores, and
(i) means operatively communicating with said vane to provide a connection for applying a torque for selectively opening and closing said vane.

3. A butterfly valve comprising:
(a) a valve body formed of two identical hollow half portions, said half portions each having an integral circular bearing boss projecting therefrom and a bearing boss receiving recess opposed from the respective bearing boss, said half portions being normally secured together and separable on a parting line and defining a passageway surrounded by said parting line,
(b) a vane in said passageway and diametrically substantially filling said passageway when aligned with said parting line, a pair of shaft members engaged with said vane, said shaft members extending radially oppositely beyond said vane and being respectively retained in said bearing bosses for rotatably supporting said vane in said passageway,
(c) said vane having a peripheral transverse protuberance extending in a half-circle circumferentially around each of said shaft members whereupon said vane presents a continuous 360-degree outer peripheral edge including said vane protuberances,
(d) a resilient sealing ring member having a portion secured between said half portions on said parting line and having a continuous 360-degree inner peripheral edge including a pair of half-circle protuberances corresponding with said vane protuberances, said sealing member peripheral edge projecting into said passageway and slidably continuously radially contacting said vane peripheral edge for sealing said passageway with said vane, and
(e) means operatively communicating with said vane for applying a torque thereto for selectively rotating said vane out of continuous contact with said sealing member edge.

References Cited by the Examiner

UNITED STATES PATENTS

| | | | |
|---|---|---|---|
| 2,703,586 | 3/1955 | Asker | 137—625.43 |
| 2,919,886 | 1/1960 | Hurst | 251—315 XR |
| 3,048,363 | 8/1962 | Garrigan | 251—367 XR |
| 3,095,177 | 6/1963 | Muller | 251—306 XR |

FOREIGN PATENTS

| | | |
|---|---|---|
| 119,865 | 7/1943 | Australia. |
| 1,024,299 | 2/1958 | Germany. |

MARTIN P. SCHWADRON, *Acting Primary Examiner.*

ISADOR WEIL, *Examiner.*